United States Patent
Gibbons

(10) Patent No.: US 6,215,611 B1
(45) Date of Patent: Apr. 10, 2001

(54) LOADER FOR VIDEO PLAYBACK MECHANISM

(76) Inventor: Brian L. Gibbons, 5760 Talmadge Rd., Independence, OR (US) 97351

( * ) Notice: Subject to any disclaimer, the term of this patent is extended or adjusted under 35 U.S.C. 154(b) by 0 days.

(21) Appl. No.: 09/160,608

(22) Filed: Sep. 25, 1998

(51) Int. Cl.[7] ................................... G11B 15/68
(52) U.S. Cl. ........................................... 360/92
(58) Field of Search .............................. 360/92; 369/36, 369/178

(56) References Cited

U.S. PATENT DOCUMENTS

| | | | |
|---|---|---|---|
| 4,023,207 | * | 5/1977 | Cook ........................ 360/92 |
| 4,133,013 | * | 1/1979 | Fisher ....................... 360/92 |
| 5,056,073 | * | 10/1991 | Fitzgerald et al. ........ 369/36 |
| 5,225,948 | * | 7/1993 | Yamashita et al. ........ 360/92 |
| 5,455,725 | * | 10/1995 | Lee ........................... 360/92 |
| 5,607,275 | * | 3/1997 | Woodruff et al. ........ 414/331 |
| 5,856,894 | * | 1/1999 | Marlowe ................... 360/92 |

* cited by examiner

Primary Examiner—Brian E. Miller

(57) ABSTRACT

A video storage mechanism loading device is provided including a base situated adjacent a video playback mechanism having an opening formed on a front face thereof for receiving a video storage mechanism for playback purposes. Also included is a plurality of holding brackets situated on the base for containing and maneuvering a plurality of video storage mechanisms. A video storage mechanism removal assembly is included for removing one of the video storage mechanisms from the base. Next provided is a transfer mechanism for moving one of the video storage mechanisms from the base to a position adjacent to the opening of the video playback mechanism. An injector unit is included for inserting the video storage mechanism from the transfer mechanism into the opening of the video playback mechanism.

7 Claims, 6 Drawing Sheets

LOADER FOR VIDEO PLAYBACK MECHANISM

BACKGROUND OF THE INVENTION

1. Field of the Invention

The present invention relates to loading systems for playback devices and more particularly pertains to a new loader for video playback mechanism for automatically loading a DVD disk or a video cassette within an associated conventional player.

2. Description of the Prior Art

The use of loading systems for playback devices is known in the prior art. More specifically, loading systems for playback devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art loading systems for playback devices include U.S. Pat. No. 4,133,013; U.S. Pat. No. 4,918,548; U.S. Pat. No. 5,225,948; U.S. Pat. No. 5,264,974; U.S. Pat. No. 4,023,207; and U.S. Patent Des. 349,282.

In these respects, the loader for video playback mechanism according to the present invention substantially departs from the conventional concepts and designs of the prior art, and in so doing provides an apparatus primarily developed for the purpose of automatically loading a DVD disk or a video cassette within an associated player.

SUMMARY OF THE INVENTION

In view of the foregoing disadvantages inherent in the known types of loading systems for playback devices now present in the prior art, the present invention provides a new loader for video playback mechanism construction wherein the same can be utilized for automatically loading a DVD disk or a video cassette within an associated player.

The general purpose of the present invention, which will be described subsequently in greater detail, is to provide a new loader for video playback mechanism apparatus and method which has many of the advantages of the loading systems for playback devices mentioned heretofore and many novel features that result in a new loader for video playback mechanism which is not anticipated, rendered obvious, suggested, or even implied by any of the prior art loading systems for playback devices, either alone or in any combination thereof.

To attain this, the present invention generally comprises a base situated on a top face of a video cassette playback mechanism. As shown in FIG. 2, a rotating track assembly is provided with a rotatable track including a plurality of sleeves hingably coupled at inboard ends thereof. Each of the sleeves are equipped with a top slot and an open outboard end, as shown in FIG. 4. With reference still to FIG. 4, it is shown that a plurality of holding brackets each include a vertically oriented upper housing with an open top and outboard face for containing a video cassette therein. A bottom guide is fixedly mounted on the upper housing for being releasably received within one of the sleeves. Further, an inverted L-shaped tab is mounted on an inboard face of the upper housing. The holding brackets may be rotated about the rotating track assembly. As best shown in FIG. 3, a holding bracket removal assembly includes an inverted L-shaped mount with a vertical portion mounted on the base interior of the rotating track assembly. Associated therewith is a horizontal portion extending over a front extent of the rotating track assembly. The holding bracket removal assembly further includes a remover arm having a top end slidably coupled to the horizontal portion of the mount. A bottom end of the remover arm has a U-shaped configuration for slidably engaging each of the inverted L-shaped tabs of the holding brackets when the holding brackets of the rotatable track are rotated. When one of the holding brackets that contains a desired video is situated in front of the holding bracket removal assembly, the remover arm engages the holding bracket and slides along the horizontal portion of the mount. As such, the remover arm removes the holding bracket and video cassette from the associated sleeve of the rotating track assembly. Mounted on the base is a dust cover for covering the rotating track assembly. Note FIG. 1. The dust cover preferably has a pair of doors which are adapted to be pivoted outwardly upon the removal of one of the holding brackets and video cassette from the rotating track assembly. As shown in FIG. 5, a pivoting assembly is provided including a post having a lower end pivotally coupled to the base in front of the holding bracket removal assembly. The lower end of the post has a sleeve portion mounted thereon for slidably engaging the bottom guide of the holding bracket which is removed from the rotating track assembly The pivoting assembly further includes an auxiliary arm having a first end pivotally coupled to the post and a second end pivotally coupled to a horizontal ball screw on the base. The auxiliary arm and ball screw work together for effecting the pivoting of the holding bracket and the video cassette from a vertical orientation to a horizontal orientation upon the sleeve portion being engaged with the holding bracket. With reference now to FIGS. 2, 5 & 6, an elevator assembly includes a pair of motors each mounted on a top of the base in front of the pivoting assembly with a worm gear situated thereon. Note FIG. 6 in particular. A pair of vertically oriented threaded rods each have an upper end with a disk-shaped gear in engagement with one of the worm gears. The worm gear and disk-shaped gear are adapted for rotating the threaded rods. Screwably engaged with the threaded rods is a pair of threaded tubes, as shown in FIG. 6. A platform is pivotally coupled to the threaded tubes. In use, the platform is adapted for being transferred between a raised orientation level with the base and a lowered orientation level with the video cassette playback mechanism by way of the worm gears. Further, the platform is adapted for pivoting between a horizontal orientation and a vertical orientation situated within the cover when the platform is in the raised orientation. For pivoting the platform between the raised and lowered orientations, the elevator assembly further includes a retracting mechanism having an inboard arm pivotally mounted to the base. An outboard arm is pivotally coupled between the inboard arm and the platform. Lastly, a gear mechanism is provided for pivoting the inboard arm which in turn pivots the platform between the vertical orientation and the horizontal orientation thereof. It should be noted that the platform is pivoted to the horizontal orientation upon the opening of the doors of the cover. Further provided is an injection unit including a holding means slidably mounted on the platform for sliding between an inboard and outboard edge of the platform. The holding means serves for removing the video cassette from the holding bracket upon the pivoting of the ejected holding bracket to the horizontal orientation. Upon the video cassette being situated on the platform in the horizontal orientation, the platform is transferred to the lowered orientation. This allows the injector unit to insert the video cassette within the video cassette playback mechanism.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new loader for video playback mechanism apparatus and method which has many of the advantages of the loading systems for playback devices mentioned heretofore and many novel features that result in a new loader for video playback mechanism which is not anticipated, rendered obvious, suggested, or even implied by any of the prior art loading systems for playback devices, either alone or in any combination thereof.

It is another object of the present invention to provide a new loader for video playback mechanism which may be easily and efficiently manufactured and marketed.

It is a further object of the present invention to provide a new loader for video playback mechanism which is of a durable and reliable construction.

An even further object of the present invention is to provide a new loader for video playback mechanism which is susceptible of a low cost of manufacture with regard to both materials and labor, and which accordingly is then susceptible of low prices of sale to the consuming public, thereby making such loader for video playback mechanism economically available to the buying public.

Still yet another object of the present invention is to provide a new loader for video playback mechanism which provides in the apparatuses and methods of the prior art some of the advantages thereof, while simultaneously overcoming some of the disadvantages normally associated therewith.

Still another object of the present invention is to provide a new loader for video playback mechanism for automatically loading a DVD disk or a video cassette within an associated player.

Even still another object of the present invention is to provide a new loader for video playback mechanism that includes a base situated adjacent the video playback mechanism having an opening formed on a front face thereof for receiving a video storage mechanism for playback purposes. Also included is a plurality of holding brackets situated on the base for containing and maneuvering a plurality of video storage mechanisms. A video storage mechanism removal assembly is included for removing one of the video storage mechanisms from the base. Next provided is a transfer mechanism for moving one of the video storage mechanisms from the base to a position adjacent to the opening of the video playback mechanism. An injector unit is included for inserting the video storage mechanism from the transfer mechanism into the opening of the video playback mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
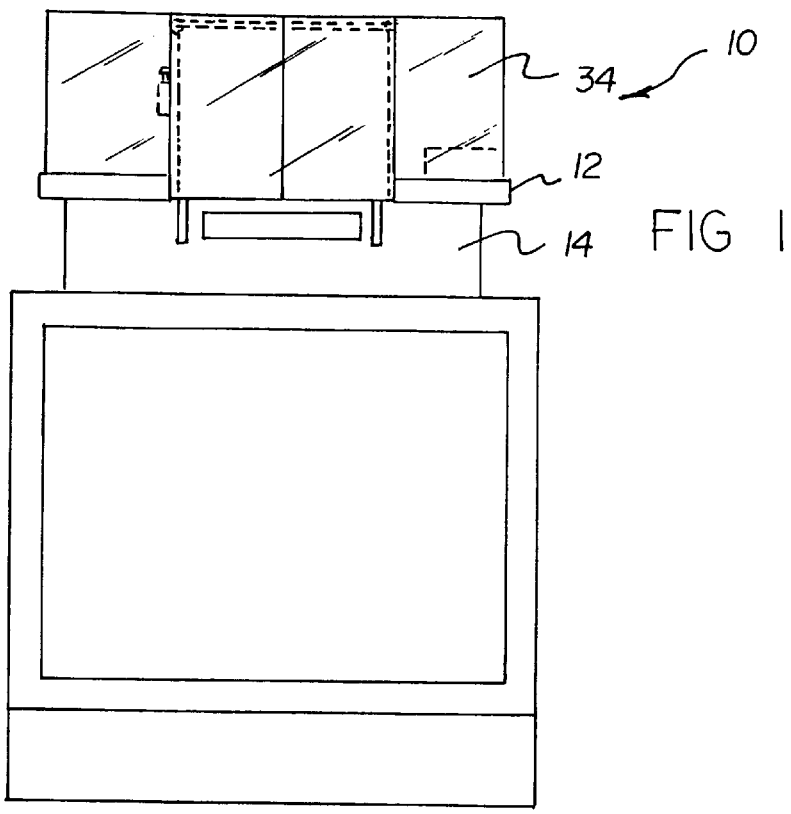
FIG. 1 is a front view of a new loader for video playback mechanism according to the present invention.

With reference now to the drawings, and in particular to FIGS. 1 through 12 thereof, a new loader for video playback mechanism embodying the principles and concepts of the present invention and generally designated by the reference numeral 10 will be described.

Figure 2:
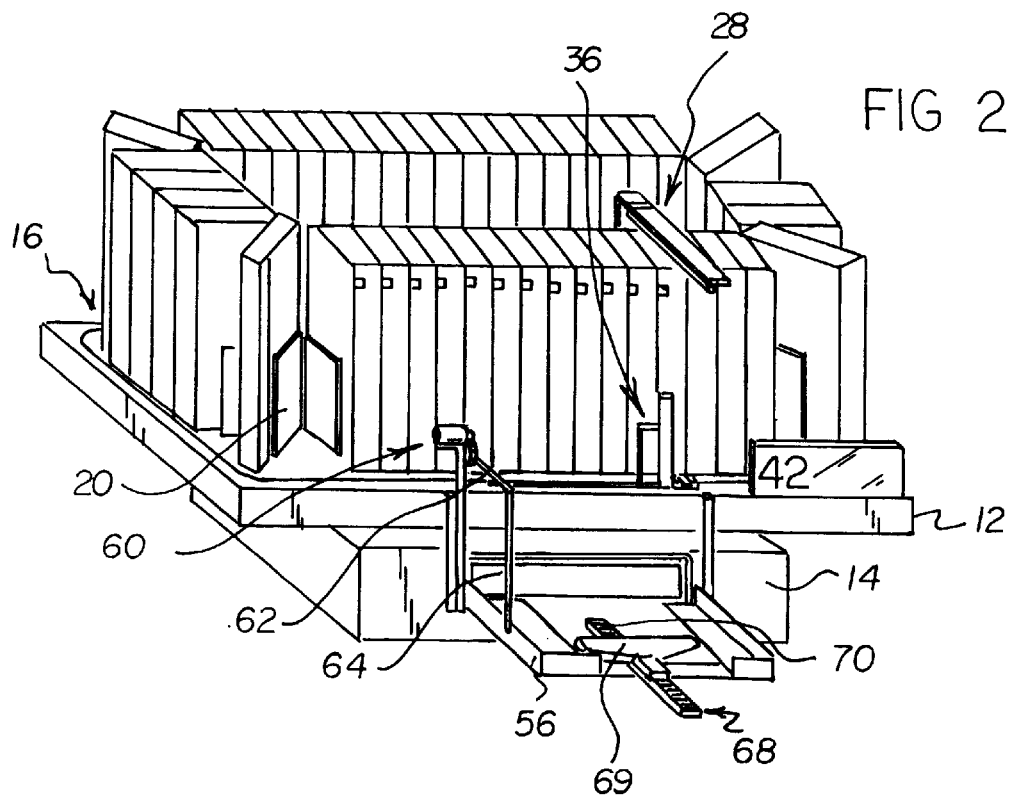
FIG. 2 is a perspective view of the present invention with the dust cover removed.

The present invention, designated as numeral 10, includes a base 12 situated on a top face of a conventional video cassette playback mechanism 14 with an opening and door formed in its front. As shown in FIG. 2, a rotating track assembly 16 is provided with a rotatable track including a plurality of sleeves 18 hingably coupled at inboard ends thereof. Each of the sleeves are equipped with a top slot and an open outboard end, as shown in FIG. 4.

Figure 4:
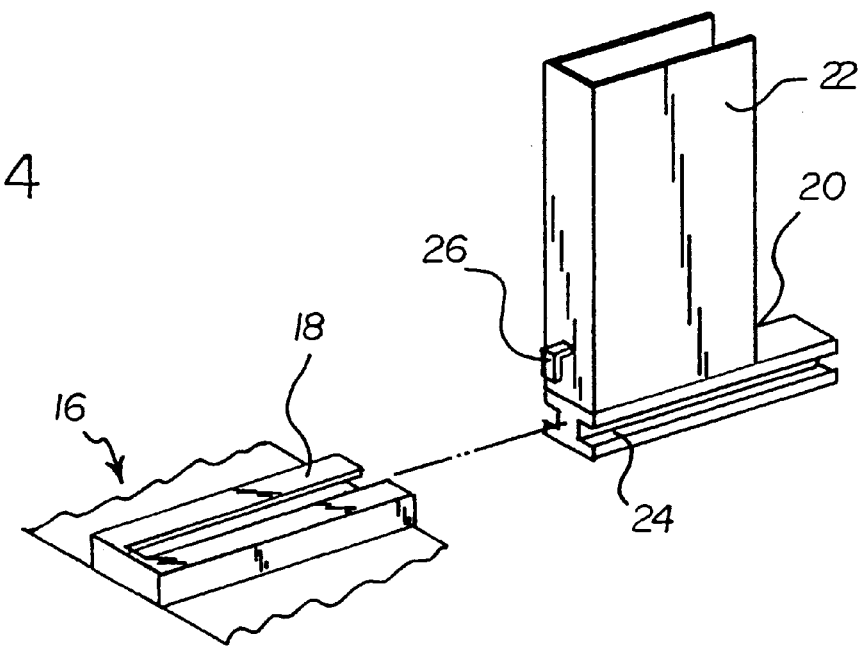
FIG. 4 is an exploded perspective view of one of the sleeves of the rotating track assembly and a holding bracket associated therewith.

With reference still to FIG. 4, it is shown that a plurality of holding brackets 20 each include a vertically oriented upper housing 22 with an open top and open outboard face for containing a video cassette therein. A bottom guide 24 is fixedly mounted on the upper housing for being releasably received within one of the sleeves. Further, an inverted L-shaped tab 26 is mounted on an inboard face of the upper housing. The holding brackets may be rotated about the rotating track assembly within the corresponding sleeves.

Figure 3:
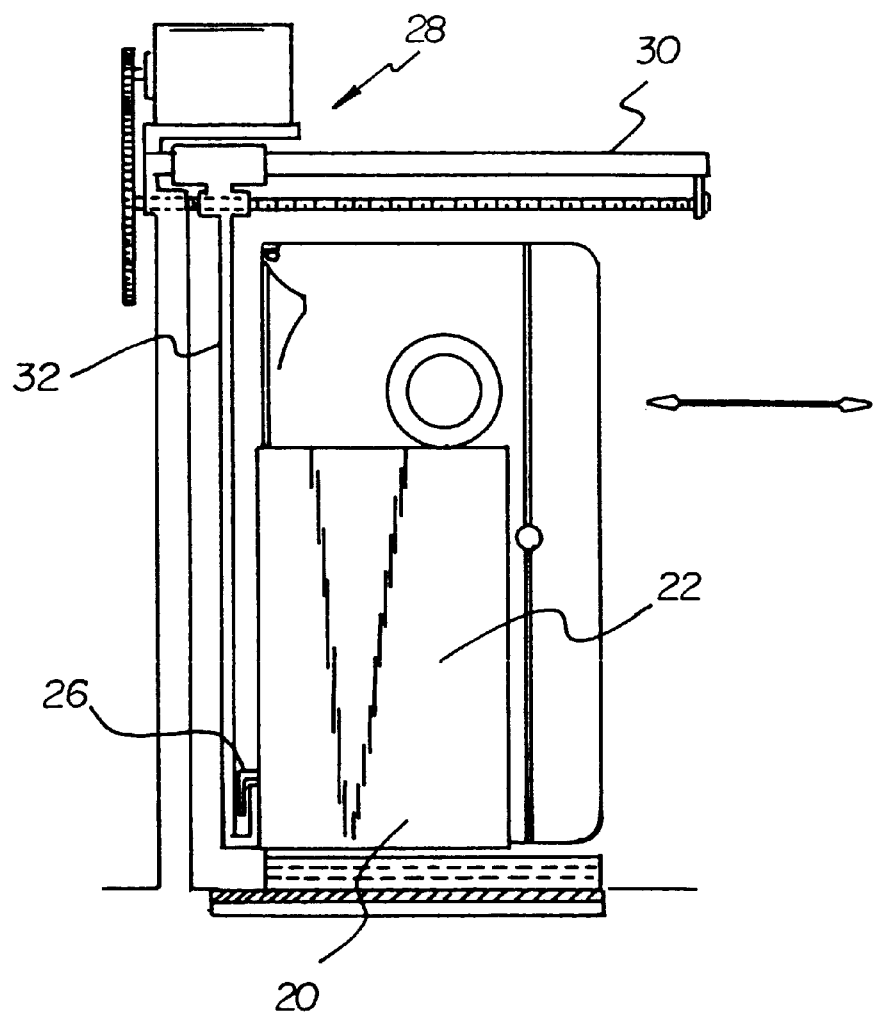
FIG. 3 is a side view of the rotating track assembly and holding bracket removal assembly.

As best shown in FIG. 3, a holding bracket removal assembly 28 includes an inverted L-shaped mount 30 with a vertical portion mounted on the base interior of the rotating track assembly. Associated therewith is a horizontal portion extending over a front extent of the rotating track assembly. The holding bracket removal assembly further includes a remover arm 32 having a top end slidably coupled to the horizontal portion of the mount. A bottom end of the remover arm has a U-shaped configuration for slidably engaging each of the inverted L-shaped tabs of the holding brackets when the holding brackets of the rotatable track are rotated.

When one of the holding brackets that contains a desired video is situated in front of the holding bracket removal assembly, the remover arm engages the holding bracket and slides along the horizontal portion of the mount. As such, the remover arm removes the holding bracket and video cassette from the associated sleeve of the rotating track assembly. This is accomplished by way of a ball screw unit which is shown in detail in FIG. 3. Selection of the desired video cassette may be accomplished with a remote control or the like. Addressing is necessary for identification of each of the holding brackets and the video cassettes situated therein.

Mounted on the base is a dust cover 34 for covering the rotating track assembly. Note FIG. 1. The dust cover preferably has a pair of doors which are adapted to be pivoted outwardly upon the removal of one of the holding brackets and video cassette from the rotating track assembly. The dust cover may be opened manually or by a way of a pair of motors per the desires of the user.

Figure 5:
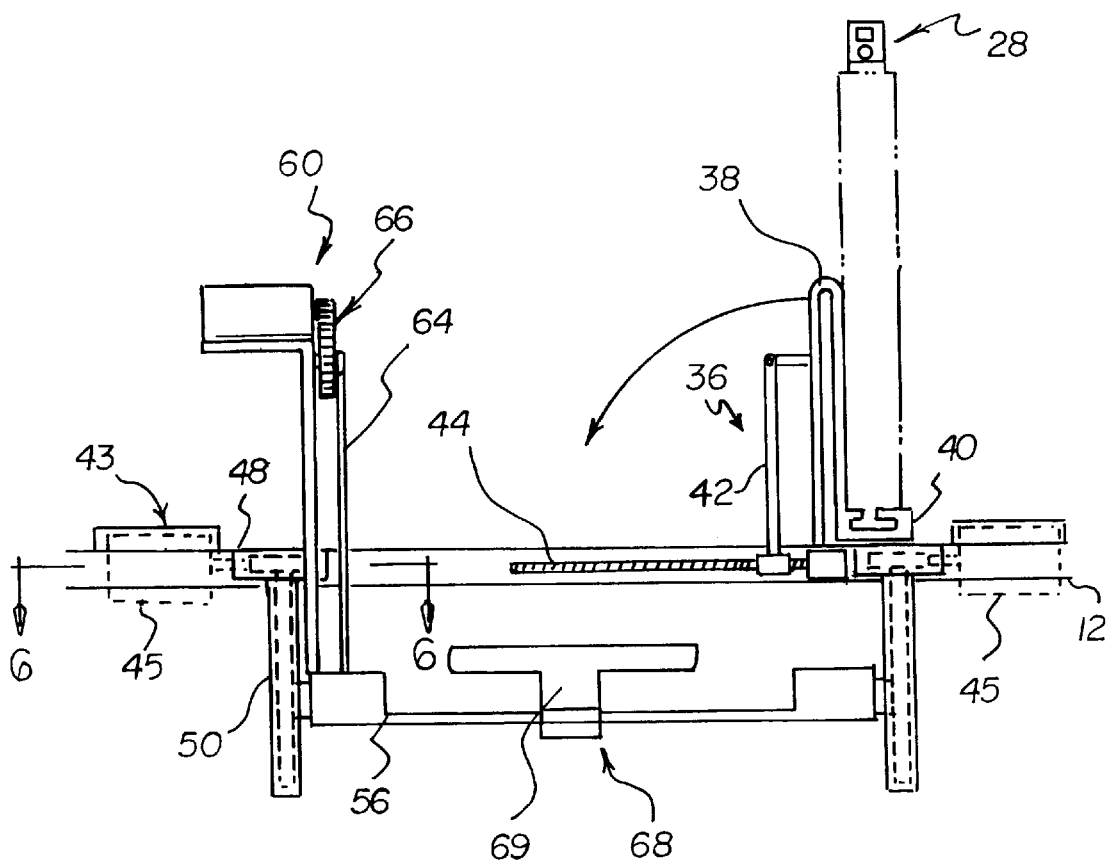
FIG. 5 is a front view of the present invention showing the pivoting assembly and elevator assembly.

As shown in FIG. 5, a pivoting assembly 36 is provided including a post 38 having a lower end pivotally coupled to the base in front of the holding bracket removal assembly. The lower end of the post has a sleeve portion 40 mounted thereon for slidably engaging the bottom guide of the holding bracket which is removed from the rotating track assembly The pivoting assembly further includes an auxiliary arm 42 having a first end pivotally coupled to the post and a second end pivotally coupled to a horizontal ball screw 44 on the base. The auxiliary arm and ball screw work together for effecting the pivoting of the holding bracket and the video cassette from a vertical orientation to a horizontal orientation upon the sleeve portion being engaged with the holding bracket.

Figure 6:
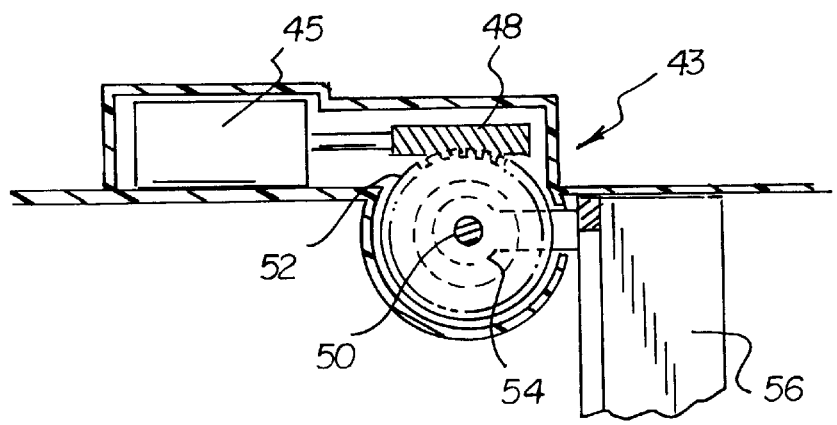
FIG. 6 is a top cross-sectional view of the present invention taken along line 6—6 shown in FIG. 5.

With reference now to FIGS. 2, 5 & 6, an elevator assembly 43 includes a pair of motors 45 each mounted on a top of the base in front of the pivoting assembly with a worm gear 48 situated thereon. Note FIG. 6 in particular. A pair of vertically oriented threaded rods 50 each have an upper end with a disk-shaped gear 52 in engagement with one of the worm gears. The worm gear and disk-shaped gear are adapted for rotating the threaded rods. Screwably engaged with the threaded rods is a pair of threaded tubes 54, as shown in FIG. 6. A platform 56 is pivotally coupled to the threaded tubes.

In use, the platform is adapted for being transferred between a raised orientation level with the base and a lowered orientation level with the video cassette playback mechanism by way of the motor and worm gears. Further, the platform is adapted for pivoting between a horizontal orientation and a vertical orientation. When in the vertical and raised orientations, the platform is situated within the dust cover.

For pivoting the platform between the raised and lowered orientations, the elevator assembly further includes a retracting mechanism 60 having an inboard arm 62 pivotally mounted to the base. An outboard arm 64 is pivotally coupled between the inboard arm and the platform. Lastly, a gear mechanism 66 is provided for pivoting the inboard arm which in turn pivots the platform between the vertical orientation and the horizontal orientation thereof. It should be noted that the platform is pivoted to the horizontal orientation upon the opening of the doors of the cover.

Further provided is an injection unit 68 including a holding means slidably mounted on the platform for sliding between an inboard and outboard edge of the platform. The sliding of the holding means may be accomplished by motor, rack and pinion. The holding means serves for removing the video cassette from the holding bracket upon the pivoting of the ejected holding bracket to the horizontal orientation.

Upon the video cassette being situated on the platform in the horizontal orientation, the platform is transferred to the lowered orientation. This allows the injector unit to insert the video cassette within the video cassette playback mechanism. So that the injector unit is capable of inserting and removing the video cassettes from the holding bracket and video playback mechanism, the same may be equipped with a pair of jaws 69 slidably mounted on a track 70. The jaws work like a pair of pliers with extra wide jaws, so that a large area of the cassette can be firmly held. Each extra wide jaw preferably has a T-shaped configuration and may be solenoid or motor actuated.

It should be noted that the operation sequence of the various components of the present invention set forth hereinabove may be accomplished by simple limit switches and conventional control circuitry.

In an alternate embodiment, the present invention is altered to accommodate digital video disks(DVDs). Note FIGS. 7–12. Differences between the DVD embodiment and the previous embodiment are readily apparent from a review of the Figures. FIG. 8 show that the holding brackets are equipped with suitably sized housings 80. For reasons that will soon become apparent, the housings further have a pair of flexible containment strips 82 which may be pivoted outwardly when biased. It should be noted that the rotating track assembly, holding bracket removal assembly and pivoting assembly of the DVD embodiment is essentially the same as the previous embodiment.

Figure 7:
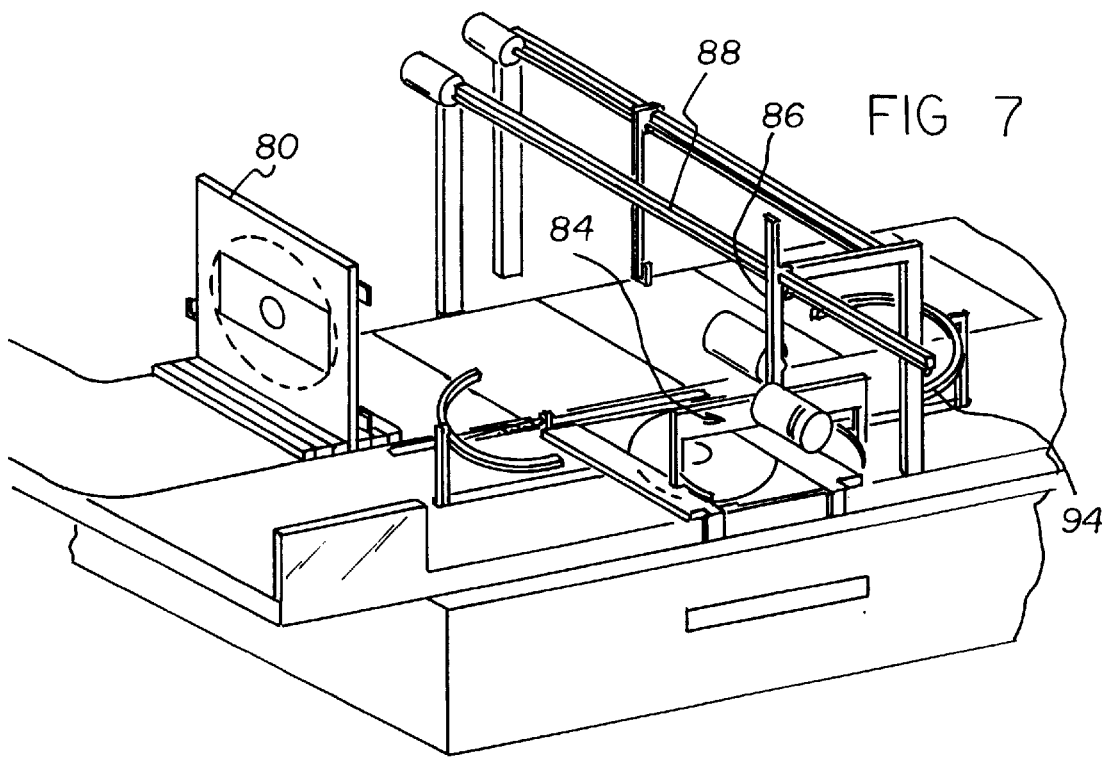
FIG. 7 is a perspective view of an alternate embodiment of the present invention.
Figure 8:
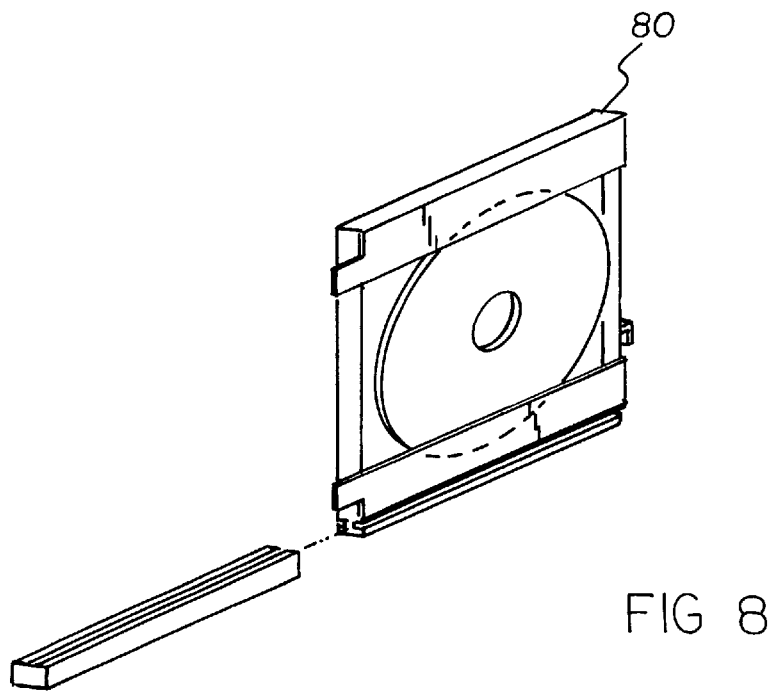
FIG. 8 is a perspective of one of the sleeves of the rotating track assembly and a holding bracket of the alternate embodiment of the present invention.

In the alternate embodiment, the elevation assembly is altered as shown in FIG. 7. As shown in such Figure, the platform and related components of the previous embodiment are replaced with a gripping arm assembly 84 which is adapted to be bottom moved toward and away from the base and further moved between different elevations. This is accomplished by the gripping arm assembly being movable along a vertical rod 86 and a horizontal rod 88 by way of conventional rack and pinion gear mechanisms.

Figure 9:
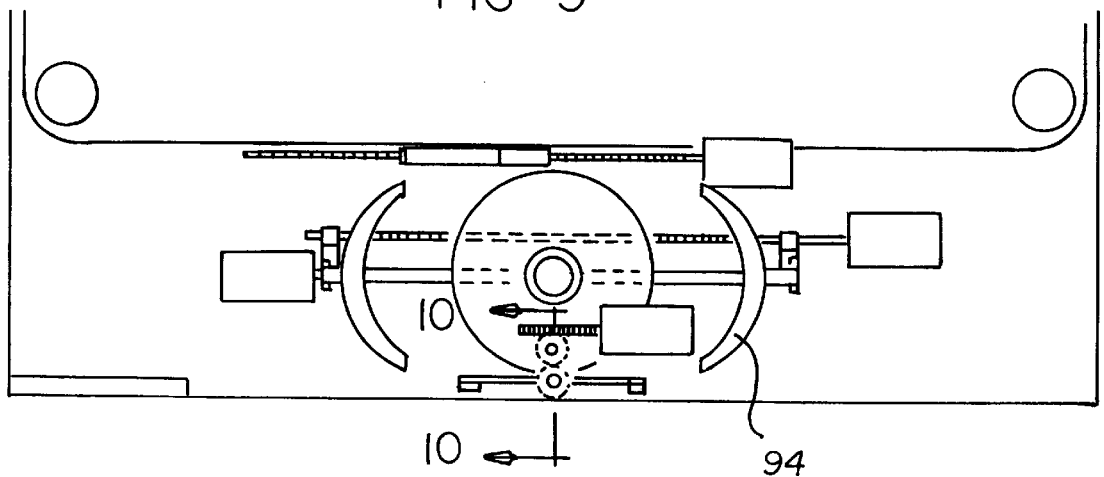
FIG. 9 is a top view of the alternate embodiment of the present invention.
Figure 10:
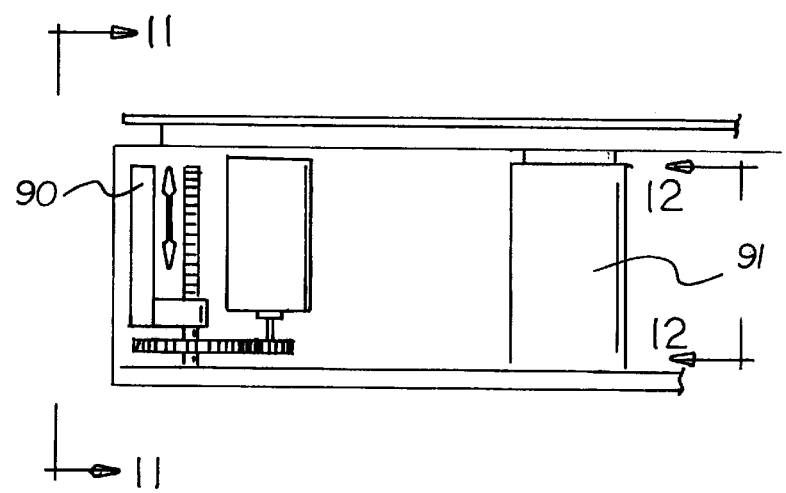
FIG. 10 is a side view of the elevation assembly of the alternate embodiment of the present invention.
Figure 11:
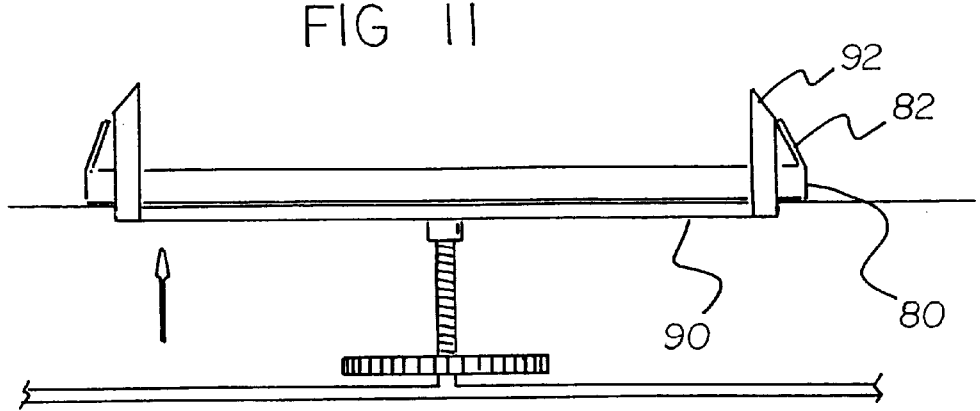
FIG. 11 is a front view of the alternate embodiment of the present invention taken along line 11—11 shown in FIG. 10.
Figure 12:
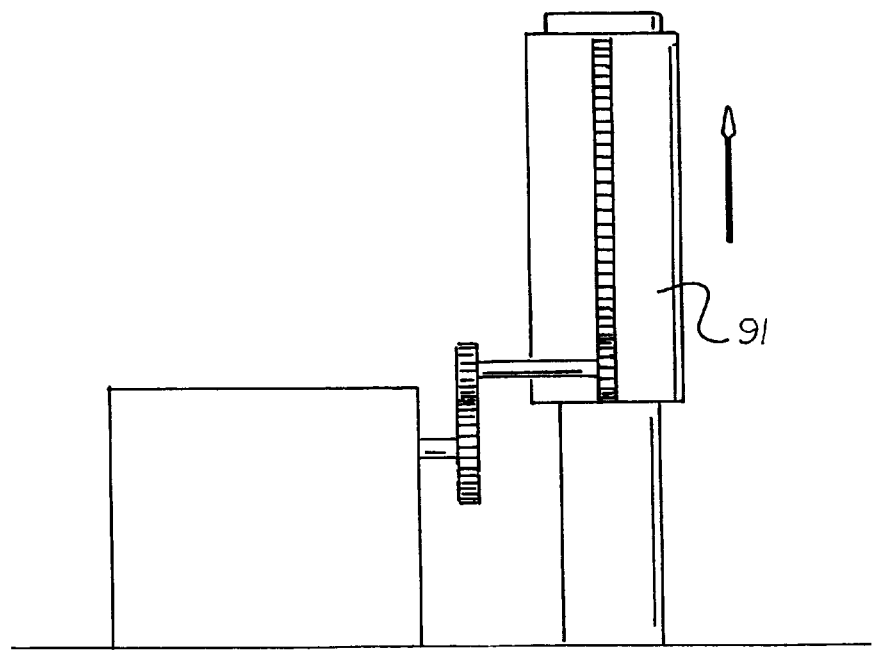
FIG. 12 is a view of the alternate embodiment of the present invention taken along line 12—12 shown in FIG. 10.

Once the holding bracket and disk are transferred to the horizontal orientation by the pivoting assembly, a post 91 shown in FIGS. 9, 10, & 12 works to elevate the disk from the holding bracket such that the gripping arm assembly may be used to transfer the disk to an associated DVD player. It should be noted that the gripping arm assembly may employ a pair of side clamps to attach to a periphery of the disk or a central clamp may be employed for securing to a central aperture of the disk. FIG. 11 shows a bar 90 with a pair of flared ends 92 which may be used to bias the flexible strips of the holding bracket. This is done prior to the post of FIG. 12 being used to elevate the disk to a position where it may be gripped by the gripping arm assembly.

As an option, a pair of semi-annular clamps 94 may be slidably mounted with respect to the base for releasably engaging the disk when elevated. The clamps are further adapted to rotate about a common axis. As such, the clamps serve to flip the disk if desired. After the disk is flipped, it may be rested on the post so access may be gained by the gripping arm assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A video cassette loading device comprising, in combination:

a base situated on a top face of a video cassette playback mechanism;

a rotating track assembly including a rotatable track including a plurality of sleeves hingably coupled at inboard ends thereof and having a top slot and an open outboard end, and a plurality of holding brackets each including a vertically oriented upper housing with an open top and outboard face for containing a video cassette therein, a bottom guide fixedly mounted on the upper housing for being releasably received within one of the sleeves and an inverted L-shaped tab mounted on an inboard face of the upper housing, wherein the holding brackets may be rotated about the rotating track assembly;

a holding bracket removal assembly including an inverted L-shaped mount with a vertical portion mounted on the base interior of the rotating track assembly and a horizontal portion extending over a front extent of the rotating track assembly, the holding bracket removal assembly further including a remover arm having a top end slidably coupled to the horizontal portion of the mount and a bottom end with a U-shaped configuration for slidably engaging each of the inverted L-shaped tabs of the holding brackets when the holding brackets of the rotatable track are rotated, wherein upon the holding bracket containing a desired video is situated in front of the holding bracket removal assembly, the remover arm engages the holding bracket and slides along the horizontal portion of the mount for removing the same from the associated sleeve of the rotating track assembly;

a dust cover mounted on the base and covering the rotating track assembly, the dust cover having a pair of doors which are adapted to be pivoted outwardly upon the removal of one of the holding brackets and video cassette from the rotating track assembly;

a pivoting assembly including a post having a lower end pivotally coupled to the base in front of the holding bracket removal assembly with a sleeve portion mounted thereon for slidably engaging the bottom guide of the holding bracket which is removed from the rotating track assembly, the pivoting assembly further including an auxiliary arm having a first end pivotally coupled to the post and a second end pivotally coupled to a horizontal ball screw on the base for effecting the pivoting of the holding bracket and the video cassette from a vertical orientation to a horizontal orientation upon the sleeve portion being engaged with the holding bracket;

an elevator assembly including a pair of motors each mounted on a top of the base in front of the pivoting assembly with a worm gear situated thereon, a pair of vertically oriented threaded rods each having an upper end with a disk-shaped gear in engagement with one of the worm gears for rotating the threaded rods, a pair of threaded tubes screwably engaged with the threaded rods, a platform pivotally coupled to the threaded tubes, wherein the platform is adapted for being transferred between a raised orientation level with the base and a lowered orientation level with the video cassette playback mechanism by way of the worm gears and further adapted for pivoting between a vertical orientation situated within the cover when the platform is in the raised orientation and a horizontal orientation;

said elevator assembly further including a retracting mechanism including an inboard arm pivotally mounted to the base, an outboard arm pivotally coupled between the inboard arm and the platform, and a gear mechanism for pivoting the inboard arm which in turn pivots the platform between the vertical orientation and the horizontal orientation thereof, wherein the platform is pivoted to the horizontal orientation upon the opening of the doors of the cover; and an injection unit including a holding means slidably mounted on the platform for sliding between an inboard and outboard edge of the platform for removing the video cassette from the holding bracket upon the pivoting of the ejected holding bracket to the horizontal orientation;

wherein the platform is transferred to the lowered orientation upon the video cassette being situated thereon in the horizontal orientation, thereby allowing the injector unit to insert the video cassette within the video cassette playback mechanism.

2. A video storage means loading device comprising:

a base situated adjacent a video playback means having an opening formed on a front face thereof for receiving a video storage means for playback purposes;

a plurality of holding brackets situated on the base for containing and maneuvering a plurality of video storage means;

a video storage means removal assembly for removing one of the video storage means from the base;

a transfer means for moving one of the video storage means from the base to a position adjacent to the opening of the video playback means;

an injector unit for inserting the video storage means from the transfer means into the opening of the video playback means;

wherein the holding brackets are removably mounted on a rotating track assembly; and wherein the transfer means includes a holding bracket removal assembly for removing one of the holding brackets and the video storage means therein from the rotating track assembly.

3. A video storage means loading device as set forth in claim 2 wherein the transfer means includes a pivoting assembly for transferring the video storage means between a vertical and a horizontal orientation.

4. A video storage means loading device as set forth in claim 2 wherein the transfer means includes an elevator assembly for transferring the video storage means from a first elevation at the base to a second elevation at the opening of the video playback means.

5. A video storage means loading device as set forth in claim 2 wherein the video storage means includes a digital video disk.

6. A video storage means loading device as set forth in claim 2 wherein the video storage means includes an analog video cassette.

7. A video storage means loading device comprising:

a base situated adjacent a video playback means having an opening for receiving a video storage means for playback purposes;

a plurality of holding brackets situated on the base for containing and maneuvering a plurality of video storage means;

a video storage means removal assembly for removing one of the video storage means from the base;

a transfer means for moving one of the video storage means from the base to a position adjacent to the opening of the video playback means; and an injector unit for inserting the video storage means from the transfer means into the opening of the video playback means;

wherein the holding brackets are removably mounted on a rotating track assembly; and wherein the transfer means includes a holding bracket removal assembly for removing one of the holding brackets and the video storage means therein from the rotating track assembly.

* * * * *